United States Patent
Nakamura et al.

(10) Patent No.: US 11,835,085 B2
(45) Date of Patent: Dec. 5, 2023

(54) BEARING ASSEMBLY FOR A THRUST BEARING

(71) Applicants: Siemens Energy Global GmbH & Co. KG, Bayern (DE); Daido Metal Co., Ltd, Nagoya (JP)

(72) Inventors: Shigetoshi Nakamura, Stuttgart (DE); Michael Kursch, Mülheim an der Ruhr (DE); Thomas Kussin, Oberhausen (DE); Toshiro Matsumoto, Aichi (JP); Dennis Wilm, Essen (DE)

(73) Assignees: Siemens Energy Global GmbH & Co. KG, Bayern (DE); Daido Metal Co., Ltd, Nagoya (JP)

(*) Notice: Subject to any disclaimer, the term of this patent is extended or adjusted under 35 U.S.C. 154(b) by 103 days.

(21) Appl. No.: 17/617,062

(22) PCT Filed: Mar. 3, 2020

(86) PCT No.: PCT/EP2020/055580
§ 371 (c)(1),
(2) Date: Dec. 7, 2021

(87) PCT Pub. No.: WO2021/001065
PCT Pub. Date: Jan. 7, 2021

(65) Prior Publication Data
US 2022/0316522 A1    Oct. 6, 2022

(30) Foreign Application Priority Data

Jul. 3, 2019  (EP) ..................... 19184159

(51) Int. Cl.
*F16C 17/24*   (2006.01)
*F16C 17/06*   (2006.01)
(Continued)

(52) U.S. Cl.
CPC ............ *F16C 17/06* (2013.01); *F16C 17/243* (2013.01); *F16C 33/20* (2013.01); *F16C 33/74* (2013.01);
(Continued)

(58) Field of Classification Search
CPC ..................... F16C 17/243; F16C 2233/00
See application file for complete search history.

(56) References Cited

U.S. PATENT DOCUMENTS 4,721,399 A    1/1988  Grosskurth
7,140,779 B2*  11/2006 Yoshimura .............. F16C 17/06
                                                              384/306
(Continued)

FOREIGN PATENT DOCUMENTS

CN     103299066 A    9/2013
CN     103688022 A    3/2014
(Continued)

OTHER PUBLICATIONS

Qiao Peng; High Temperature Failure Analysis of Multi shaft Compressor Thrust Bearing; Plant Maintenance Engineering, No. 6; Mar. 25, 2018.
(Continued)

*Primary Examiner* — James Pilkington
(74) *Attorney, Agent, or Firm* — WOLTER VAN DYKE DAVIS, PLLC

(57) ABSTRACT

A bearing assembly for a turbo-engine with a bearing and parts of a bearing temperature detecting device. The bearing includes a main body having a thermoplastic bearing layer. A space is defined in the interior of the main body and of the thermoplastic bearing layer for accommodating parts of the bearing temperature detecting device. The space has a through hole having a first opening in the thermoplastic bearing layer and a second opening located in the main body.

(Continued)

The parts include a temperature conducting element, a temperature sensor, and a securing fixture that attaches the temperature conducting element. The first opening of the through hole has a chamfer and the first end of temperature conducting element has a head which is correspondingly shaped to the chamfer in a form fitting manner. The center-axis of the temperature sensor extends transversely to the center-axis of the temperature conducting element.

15 Claims, 2 Drawing Sheets

(51) Int. Cl.
    *F16C 33/20*     (2006.01)
    *F16C 33/74*     (2006.01)

(52) U.S. Cl.
    CPC ...... *F16C 2202/20* (2013.01); *F16C 2233/00* (2013.01)

(56) References Cited

U.S. PATENT DOCUMENTS

| | | | |
|---|---|---|---|
| 7,682,084 B2* | 3/2010 | Yoshimura | F16C 17/243 |
| | | | 384/306 |
| 9,388,848 B2 | 7/2016 | Larsen | |
| 2003/0155721 A1 | 8/2003 | Zheng | |
| 2005/0013521 A1 | 1/2005 | Yoshimura | |
| 2009/0091203 A1 | 4/2009 | Petereit | |
| 2010/0239204 A1 | 9/2010 | Kaikogi et al. | |
| 2013/0315516 A1 | 11/2013 | Bertea | |
| 2014/0147247 A1 | 5/2014 | Janssen | |
| 2017/0298775 A1 | 10/2017 | Mathias | |

FOREIGN PATENT DOCUMENTS

| | | |
|---|---|---|
| CN | 104603480 A | 5/2015 |
| DE | 3418451 A1 | 11/1985 |
| DE | 10100551 A1 | 7/2001 |
| DE | 102006019873 B3 | 10/2007 |
| EP | 0161644 A2 | 11/1985 |
| JP | H1183569 A | 3/1999 |
| JP | H11125244 A | 5/1999 |
| JP | 2014163428 A | 9/2014 |
| JP | 2014163434 A | 9/2014 |
| WO | 9310365 A1 | 5/1993 |
| WO | 2008054019 A1 | 5/2008 |

OTHER PUBLICATIONS

Miao Enming Fei Yetai; Heat Conduction Analysis of Stepped Shaft; Journal of Applied Sciences, No. 3 ; Sep. 30, 2003.
PCT International Search Report and Written Opinion of International Searching Authority dated Jun. 24, 2020 corresponding to PCT International Application No. PCT/EP2020/055580 filed Mar. 3, 2020.

* cited by examiner

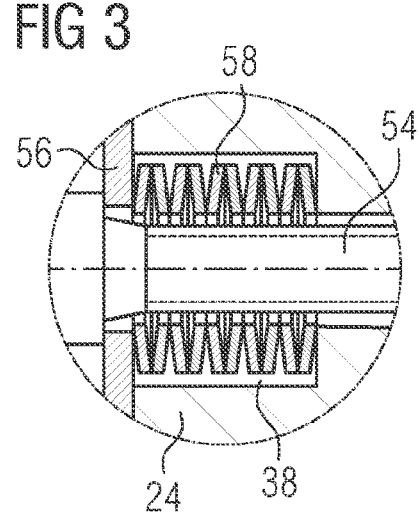
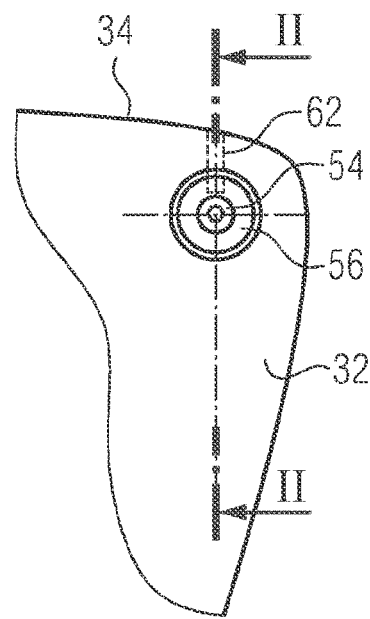

BEARING ASSEMBLY FOR A THRUST BEARING

CROSS REFERENCE TO RELATED APPLICATIONS

This application is the US National Stage of International Application No. PCT/EP2020/055580 filed 3 Mar. 2020, and claims the benefit thereof. The International Application claims the benefit of European Application No. EP19184159 filed 3 Jul. 2019. All of the applications are incorporated by reference herein in their entirety.

FIELD OF INVENTION

The present invention relates to a bearing assembly, especially of a turbo-engine, comprising a main body having a first surface, onto which a thermoplastic bearing layer having a bearing surface is adhered, and a second surface which is opposingly located to the first surface, a space within the main body and in the thermoplastic bearing layer for accommodating parts constituting a bearing temperature detecting device, wherein the space comprises a through hole having two opposingly located openings, of which the first opening is located in the bearing surface of the thermoplastic bearing layer and the second openings is located in the second surface of the main body, wherein the parts comprise a temperature conducting element assembled into the through hole such, that its first end i) flushes with the bearing surface of the thermoplastic bearing layer or advantageously ii) is located slightly below said bearing surface, a temperature sensor being in contact with the temperature conducting element and at securing fixture attaching the temperature conducting element resiliently to the main body.

BACKGROUND OF INVENTION

Bearings with a thermoplastic bearing layer and a temperature detecting device as mentioned above are known i.e. from US 2010/0239204 A1. According to this publication the thermocouple is inserted into a temperature conducting element located within a backing material, of which the bearing pad is made. For ease of manufacture, the backing material comprises one through hole into which both the temperature conducting element and the thermocouple are inserted from the side that is opposite of the bearing surface. In an outermost position of the temperature conducting element, a collar of the temperature conducting element touches a shoulder of the through hole to facilitate the outer end of the temperature conducting element slightly below the bearing surface. This design guarantees that in each operating state said outer end of the temperature conducting element is below the plane of the bearing surface, with the aim that the outer end does not protrude above the bearing surface. Otherwise this could lead to a contact of the temperature conducting element with the shaft being borne, which could damage either the temperature conducting element, the shaft or both.

However, in case of defects of the thermocouple the bearing must be disassembled for accessing the thermocouple. This is rather time consuming and prolongs downtime of the engine unnecessarily. Other defects, especially mechanical defects to the fixture of the temperature conducting element could lead to bearing oil leakages.

SUMMARY OF THE INVENTION

Therefore, an object of the present invention is to provide a new bearing comprising a bearing temperature detecting device which is service-friendlier and/or more accurate and/or more reliable than known arrangements.

With the forgoing and other objects in view there is provided in accordance with the invention, a bearing assembly for a turbo-engine, comprising a bearing and parts of a bearing temperature detecting device, the bearing comprising a main body having a first surface, onto which a thermoplastic bearing layer is adhered, and a second surface which is opposite to the first surface, the thermoplastic bearing layer forms a bearing surface, a space is defined in the interior of the main body and of the thermoplastic bearing layer at least for accommodating parts of the bearing temperature detecting device, wherein the space comprises a first hole, the first hole is a through hole having a first opening located in the bearing surface of the thermoplastic bearing layer and a second opening located in the second surface of the main body, wherein the parts comprise a temperature conducting element having a peripheral surface and a first end with a first end surface, a temperature sensor in contact with the temperature conducting element and a securing fixture that attaches the temperature conducting element resiliently to the main body, wherein the temperature conducting element is assembled into the through hole such that its first end surface is either flush with the bearing surface of the thermoplastic bearing layer or is located slightly below said bearing surface, wherein the first opening of the through hole comprises a chamfer or a step and the first end of temperature conducting element comprises a head which is correspondingly shaped to the chamfer or step in a form fitting manner with the chamfer or step.

By the virtue of the chamfer or the step an improved sealing performance can be assured, especially, when the chamfer or step extends circumferentially in an endless manner. When the first opening of the through hole comprises a chamfer, the first end of the temperature conducting element is shaped correspondingly. The mutually matching features supports proper positioning of temperature conducting element within the space. When the chamfer and the first end of the temperature conducting element extends circumferentially in a form-fitting manner, their inclined conical surfaces are self-centering to each other with an endless or annular sealing contact therebetween. Then, best sealing effect could be achieved. During operation of the bearing the positioning of the temperature conducting element is further supported from the liquid lubricant, usually lubricating oil, which is exposed usually to a pressure. The pressurized lubricant is pressing the temperature conducting element firmly into its conical or stepped seat, which is provided by the chamfered or stepped opening of the through hole. This contributes to a tight sealing also. The entrance of lubricant into the space of the main body and into other spaces of the bearing further beyond is securely avoided. This results in reliable bearing operation without any lubricant leakages mentioned above.

According to an embodiment of the invention the space comprises a second hole for accommodating the temperature sensor, the second hole having a first opening in a third surface of the main body, a second opening joining the through hole and a center-axis between its openings that is directed transversely to a center-axis of the through hole, wherein the temperature sensor extends through the second hole and contacts the temperature conducting element at its peripheral surface or extends into the temperature conducting element. In this case the temperature sensor is easier and faster accessible than in prior known solutions, because it can be assembly and/or disassembly into/from the main body without the disassembly of the latter itself. In the prior art, also the main body has to be disassembled when a temperature sensor has to exchanged. The inventor recognized, that the accessibility of the bearing is better laterally, i.d. from the third surface than from the second surface. Hence, this embodiment provide a reduced service time increasing the availability of the inventive bearing, when its temperature sensor has to be replaced. It is noted that this feature can be used independently from the type of assembly from the temperature conducting element, i.e. independently, if the temperature conducting element is assembled from the bearing surface or from the second surface of the main body, and also independently from the shape of its head.

In accordance with an added feature the space comprises a third hole for accommodating an anti-rotation pin, the third hole having a first opening in a third surface of the main body, a second opening joining the through hole and a center-axis between its openings that is directed transversely to a center-axis of the through hole, wherein the anti-rotation pin is fixed, especially screwed into the third hole and contacts firmly the temperature conducting element at its peripheral surface or extends into the temperature conducting element. The provision of the anti-rotation pin supports the fixation of the temperature conduction element at the main body on the one hand, when a securing fixture for the attachment of the temperature conducting element at the main body will be assembled. On the other hand, if the temperature sensor contacts the temperature conducting element in its center through a hole in the peripheral surface of the temperature conducting element, the temperature sensor is protected again shearing.

According to another embodiment of the invention the securing fixture comprise a screw, a screw guide plate and at least one spring for attaching the temperature conducting element resiliently at the main body, wherein the temperature conducting element comprises a second end opposite its first end, the screw is screwed into the second end pressing the at least one spring against the main body, especially via the screw guide plate. This configuration draws resiliently the temperature conduction element into the space. Then the temperature conduction element is securely positioned such that its first end does not protrude over the bearing surface. This avoids damages to the temperature conduction element and/or the shaft being borne.

A construction space saving embodiment is achieved as an embodiment, when the screw, the screw guide plate and the disk springs are sunk-in below the level of the second surface of the main body.

Further, the temperature conducting element is made of copper or material with similar or better thermal conductivity. Then the temperature conducting element is made of a material with improved heat conducting properties compared to both, the material of the thermoplastic bearing layer and the material of the main body. With such an arrangement the lubricant temperature can be determined accurately with smaller delays. This means that temperature changes in the lubricant are transferred by the temperature conducting element without significant delay to the temperature sensor.

Further, the temperature sensor is a thermocouple. Thermocouples are in general reliable sensors that are easy to manufacture and less expensive.

According to another embodiment of the invention the temperature conducting element is at least substantially thermally insulated from the main body. In other words: An insulation is arranged at least partially between the temperature conducting element and the main body, which reduces the thermal influence of the latter. An adulteration of the lubricant temperature is reduced leading to a more accurate temperature determination by the bearing temperature detecting device.

Further and for enabling better sealing properties, the chamfer extents only through the thermoplastic bearing layer, but not into the main body. Alternatively, it is possible that the chamfer extends through the thermoplastic bearing layer into the main body. Then, the temperature conducting element is in contact with the chamfer only in the range of the thermoplastic bearing layer for being insulated from the main body itself. Again, this avoids an adulteration of the lubricant temperature determined by the bearing temperature detecting device.

Of course, a turbo-engine can comprise at least one bearing described above. In this case, but also in other cases, the bearing described above, can embodied as a bearing pad of a thrust bearing, also known as tilting pad, or as a fixed profile of a journal bearing, also known as curved bearing shell.

Although the invention is illustrated and described herein as a bearing in general, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3 is a sectional, enlarged view through a first exemplary embodiment of the securing fixtures and FIG. 4 is a side view onto a section of the second surface of the bearing assembly according to the exemplary embodiment.

DETAILED DESCRIPTION OF INVENTION

In the following figure description identical features will be referenced by the same reference signs.

Figure 1:
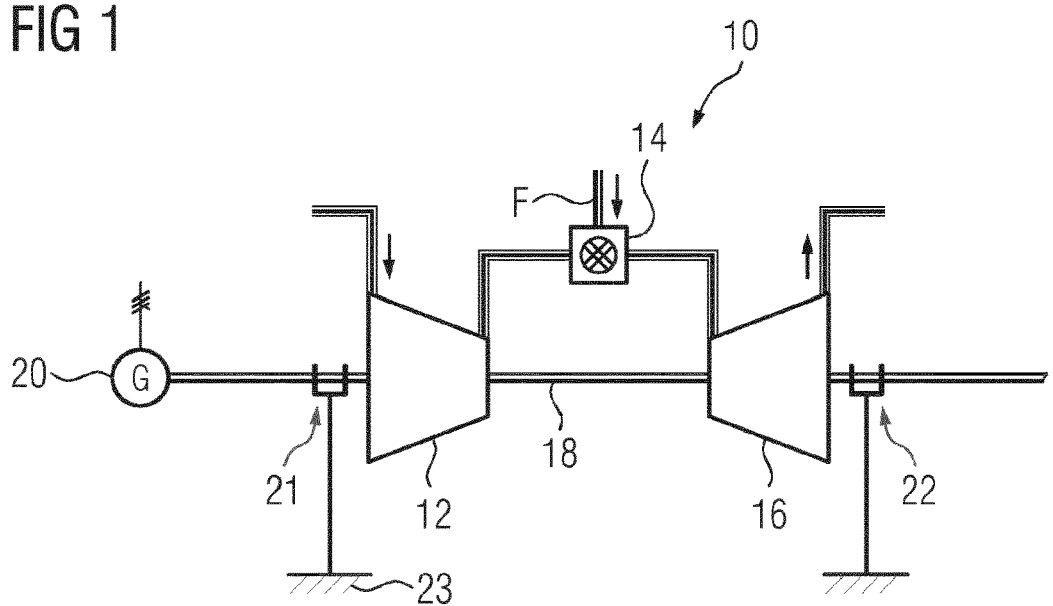
FIG. 1 shows schematically a gas turbine with a rotor and two bearing assemblies.

FIG. 1 shows, as an example of a turbo-engine 10, a gas turbine. The gas turbine comprises a compressor 12, a combustion chamber 14 and a turbine section 16. A rotor 18 extends through the compressor 12 and the turbine section 16 and is connected to a generator 20. The rotor 18 of the gas turbine 10 is borne by two bearing assemblies 21, 22 on a foundation 23. The bearing assemblies 21, 22 are only displayed schematically in FIG. 1. The bearing assembly 21 located next to the compressor is usually embodied as combined or separated journal and thrust bearing, while the bearing assembly 22 located next to the turbine section 16 is embodied only as a journal bearing.

The compressor 12 and the turbine section 16 each comprises rows of rotor blades and stator vanes (not shown) which alternate each other in known manner. In use, air enters the compressor and is compressed and channeled into the combustion chamber where it mixes with fuel F and is burnt. The resulting combustion gases enter the turbine and expand thereby driving the rotor 18. Simultaneously the rotor 18 drives the generator 20 which transforms mechanical energy of the rotor 18 into electrical energy. The electrical energy is supplied to a grid.

Figure 2:
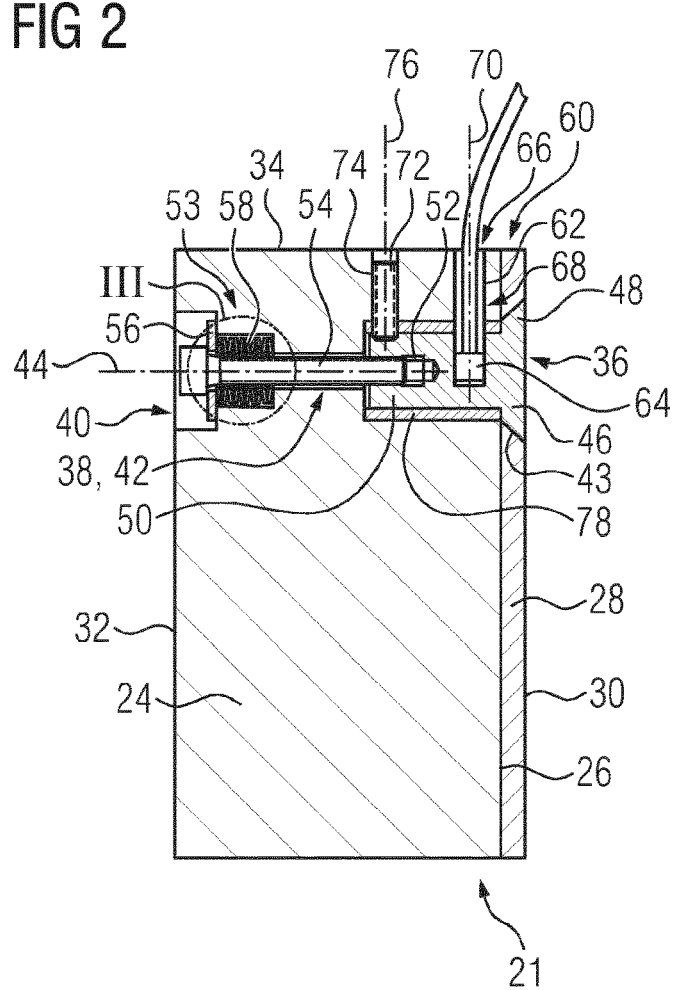
FIG. 2 is a sectional view through an exemplary embodiment of a bearing assembly comprising a thermoplastic bearing layer.

FIG. 2 shows in a sectional view through an exemplary embodiment of bearing assembly 21. In this example the bearing assembly 21 is designed as a tilting pad of the thrust bearing. The bearing assembly 21 comprises a main body 24, usually made from metal, having a first surface 26, onto which a thermoplastic bearing layer 28 having a bearing surface 30 is attached or adhered. Usually the thermoplastic bearing layer is made of Polyetheretherketone, which is also known as PEEK. The bearing surface is designed for bearing against a rotor or shaft (not shown in FIG. 2) of the gas turbine or turbo-engine.

Opposite the first surface 26, the main body 24 comprises a second surface 32. A third surface 34 is arranged between the two opposing first and second surfaces 26, 32 and connects both. In this example and according to the sectional view the first and third surfaces 26 and 34 and the second and third surfaces 32 and 34 are perpendicular arranged to each other. However, other angles between said surfaces are possible. The bearing is supported by a conventional bearing carrier, but the bearing carrier is omitted for the sake of clarity.

In the bearing surface 30 a countersunk shaped first opening 36 of a space 38 is arranged. The space 38 extends from said first opening to a second opening 40 in form of a first, a through hole 42 through the main body. The through hole 42 has a circular cross section. A chamfer 43 extends circumferentially along the first opening 36 in an endless manner and is provided in the thermoplastic bearing layer 28. This generates said countersunk shape of the first opening 36 with a straight profile of convergent cross sections as seen from outside to inside. In this example, the profile of the countersunk first opening does not extend into the main body but in other embodiments the countersunk profile may extend into the main body. The first opening 36 and second opening 40 have different diameters according to the space requirement of the devices assembled therein. A virtual center-axis 44 can be drawn from the center of the first opening 36 to the center of the second opening 40.

In the space 38 a temperature conducting element 46, made of copper, is assembled in a direction from the bearing surface. This plug shaped temperature conducting element 46 comprises a first end 48 that is correspondingly shaped to the circumferentially chamfer 43 constituting the countersunk shaped first opening 36. Hence, the first end 48 of the temperature conducting element 46 is embodied as a countersunk shaped head with a first end surface. The temperature conducting element is in general shaped like a countersunk head rivet.

Opposite the first end 48 of the temperature conducting element 46, a second end 50 comprises a threaded hole 52, into which a screw 54 is screwed in. In this example, the screw has an inner hexagon recess to facilitate insertion to the threaded hole 52. Said inner hexagon screw 54 presses a screw guide plate 56 against one or more disk springs 58 (FIGS. 3, 4) with the object of drawing the temperature conducting element resiliently into the space 38, away from the bearing surface 30 and from the first opening 36. This securing fixture 53 brings the inclined surfaces of the countersunk shaped head of the temperature conducting element 46 in tight, uninterrupted sealing contact with the corresponding surface of the countersunk shaped first opening 36.

The second opening 40 of the trough hole 42 is sized such, that the screw, the screw guide plate 56 and the disk springs 58 are sunk-in below the level of the second surface 32 of the main body 24. Depending on the axial length of the temperature conducting element 46, its first end surface is either flush with the bearing surface 30 of the thermoplastic bearing layer 28 or is located slightly below said bearing surface 30. As displayed in FIG. 2 the first end 48 is flush with the bearing surface 30.

Further, the space 38 comprises a second hole 62 for accommodating a temperature sensor 64, the second hole 62 having a first opening 66 in the third surface 34 of the main body 24 and second opening 68 joining the through hole 42 and a center-axis 70 between its openings 66, 68, that center-axis 70 is directed transversely, in FIG. 3 perpendicular to the center-axis 44 of the through hole 42. In this example, the temperature sensor 64 extends through the second hole 62 and contacts firmly the temperature conducting element 46 through its peripheral surface at a bottom of a blind hole that ends near or in the radial center of the temperature conducting element 46. Hence, a bearing temperature detecting device 60 comprises at least the temperature conducting element 46 and the temperature sensor 64, e.g. a thermocouple, both being in tight contact to each other.

The space 38 further comprises a third hole 74 for accommodating an anti-rotation pin 72, the third hole 74 having a first opening in a third surface 34 of the main body 24, a second opening joining the through hole 42 and a center-axis 76 between its openings which center-axis 76 is directed transversely, in FIG. 3 perpendicular, to the center-axis 44 of the through hole 42. The anti-rotation pin 72 is fixed by screwing into the third hole 74 and contacts firmly the temperature conducting element at its peripheral surface. Beneficially to prevent any rotation of the temperature conducting element 46 in its space 38, the contact area of temperature conducting element 46 for contacting the anti-rotation pin is either flat or comprises (as displayed) a blind hole into which the anti-rotation pin 72 extends.

An insulation layer 78 is arranged between the temperature conducting element 46 and the main body 24.

Independently if the bearing assemblies 21, 22 are embodied as a titling pad of a thrust bearing or as a fixed profile of a journal bearing, the temperature sensor 64 is easily accessible at the third surface 34 of the main body 24. In the above-mentioned prior art, the temperature sensor 64 is arranged in the second surface where no or worse accessibility is given, when the bearing 22 is assembled in a bearing carrier. Usually the second surface is covered completely by said bearing carrier, why the lateral accessibility of the bearing at the third surface of the main body is better compared to the second surface.

In summary the invention relates to a bearing assembly 21, 22 for a turbo-engine, comprising a bearing and parts of a bearing temperature detecting device 60, the bearing comprising: a main body 24 having a thermoplastic bearing layer 28 that forms a bearing surface 30, a space 38 is defined in the interior of the main body 24 and of the thermoplastic bearing layer 28 at least for accommodating parts of the bearing temperature detecting device 60, wherein the space 38 comprises a through hole 42 having a first opening 36 located in the bearing surface 30 of the thermoplastic bearing layer 28 and a second opening 40 located in the second surface 32 of the main body 24, wherein the parts comprise a temperature conducting element 46 having a peripheral surface and a first end 48 with a first end surface, a temperature sensor 64 in contact with the temperature conducting element 46 and a securing fixture 53 that attaches the temperature conducting element. To provide a bearing assembly with improved sealing properties, the first opening 36 of the through hole 42 comprises a chamfer 43 or a step and the first end 48 of temperature conducting element 46 comprises a head which is correspondingly shaped to the chamfer 43 or step in a form fitting manner with the chamfer 43 or step. For reduced downtime in a case of a temperature sensor 64 defect, the center-axis of the temperature sensor extends transversely to the center-axis of the temperature conducting element.

The invention claimed is:

1. A bearing assembly for a turbo-engine, comprising:
   a bearing and parts of a bearing temperature detecting device,
   wherein the bearing comprises:
      a main body having a first surface, onto which a thermoplastic bearing layer is adhered, and a second surface which is opposite to the first surface, the thermoplastic bearing layer forms a bearing surface,
      a space is defined in the interior of the main body and the thermoplastic bearing layer at least for accommodating the parts of the bearing temperature detecting device,
      wherein the space comprises a first hole, wherein the first hole is a through hole having a first opening located in the bearing surface of the thermoplastic bearing layer, and a second opening located in the second surface of the main body,
   wherein the parts of the bearing temperature detecting device comprise:
      a temperature conducting element having a peripheral surface and a first end with a first end surface,
      a temperature sensor in contact with the temperature conducting element and
      a securing fixture that attaches the temperature conducting element resiliently to the main body,
      wherein the temperature conducting element is assembled into the through hole such that its first end surface is either flush with the bearing surface of the thermoplastic bearing layer or is located below said bearing surface, and
   wherein the first opening of the through hole comprises convergent cross sections as seen from outside to inside the first opening and the first end of the temperature conducting element comprises a head which is correspondingly shaped to the convergent cross sections of the through hole in a form fitting manner with the convergent cross sections of the through hole.

2. The bearing assembly according to claim 1,
   wherein the space comprises a second hole for accommodating the temperature sensor,
   wherein the second hole comprises:
      a first opening in a third surface of the main body,
      a second opening joining with the through hole, and
      a center-axis between its openings that is directed transversely to a center-axis of the through hole, and
   wherein the temperature sensor extends through the second hole and contacts the temperature conducting element at its peripheral surface or extends into the temperature conducting element.

3. The bearing assembly according to claim 2,
   wherein the space comprises a third hole for accommodating an anti-rotation pin,
   wherein the third hole comprises:
      a first opening in the third surface of the main body,
      a second opening joining the through hole, and
      a center-axis between its openings that is directed transversely to a center-axis of the through hole, and
   wherein the anti-rotation pin is fixed into the third hole and contacts the temperature conducting element at its peripheral surface or extends into the temperature conducting element.

4. The bearing assembly according to claim 3,
   wherein the anti-rotation pin is screwed into the third hole.

5. The bearing assembly according to claim 1,
   wherein the securing fixture comprises:
      a screw,
      a screw guide plate, and
      at least one spring for attaching the temperature conducting element resiliently at the main body, and
   wherein the temperature conducting element comprises a second end opposite its first end, the screw is screwed into the second end pressing the at least one spring against the main body.

6. The bearing assembly according to claim 5,
   wherein the screw, the screw guide plate and the at least one spring are sunk-in below the second surface of the main body.

7. The bearing assembly according to claim 5,
   wherein the screw is screwed into the second end pressing the at least one spring, via the screw guide plate, against the main body.

8. The bearing assembly according to claim 1,
   wherein the temperature conducting element is made of copper or material with similar or better thermal conductivity.

9. The bearing assembly according to claim 1,
   wherein the temperature sensor is a thermocouple.

10. The bearing assembly according to claim 1,
    wherein the temperature conducting element is at least substantially thermally insulated from the main body.

11. The bearing assembly according to claim 1,
    wherein the convergent cross sections of the through hole extend through the thermoplastic bearing layer only.

12. The bearing assembly according to claim 1,
    wherein the temperature conducting element is in contact with the convergent cross sections of the through hole only in a range of the thermoplastic bearing layer.

13. The bearing assembly according to claim 1,
    wherein the bearing is anyone of the group comprising a tilting pad or a fixed profile bearing.

14. The bearing assembly according to claim 1, wherein the first opening of the through hole comprises a chamfer.

15. A turbo-engine comprising:
    at least one bearing assembly according to claim 1.

* * * * *